United States Patent [19]
Larker et al.

[11] 3,865,387
[45] Feb. 11, 1975

[54] HIGH PRESSURE SEAL

[75] Inventors: Hans Larker; Jan Nilsson, both of Robertsfors, Sweden

[73] Assignee: Allmanna Svenska Elektriska Aktiebolaget, Vasteras, Sweden

[22] Filed: Apr. 19, 1974

[21] Appl. No.: 462,401

[30] Foreign Application Priority Data
May 7, 1973 Sweden.............................. 73063505

[52] U.S. Cl.................. 277/190, 277/117, 277/143
[51] Int. Cl............................................. F16j 15/56
[58] Field of Search............ 277/190, 191, 117-122, 277/143, 144

[56] References Cited
UNITED STATES PATENTS
| | | | |
|---|---|---|---|
| 2,931,671 | 5/1960 | Beeley | 277/190 |
| 3,606,356 | 9/1971 | Beroset | 277/190 |
| 3,833,227 | 9/1974 | Nilsson | 277/191 |

Primary Examiner—Robert I. Smith

[57] ABSTRACT

In a high pressure pressure press which has a seal holder, a high pressure seal is provided between the wall of a high pressure cylinder and a die or an axially movable plunger projecting into the cylinder, which is composed of two sealing rings, one of which has an outer surface abutting the cylindrical wall and an end surface abutting the seal holder, while the other ring has a cylindrical surface abutting the plunger and a surface abutting the seal holder. The portion of the outer surface of the first ring abutting the cylindrical wall which is nearest to the seal holder is provided with generally longitudinally extending draining channels therein.

The sealing ring which makes contact with the inner cylindrical wall of the chamber is prestressed and has a normal outer diameter which is more than 0.1 per cent greater than that of the high pressure cylinder, thus making contact with the cylindrical wall with a force dependent on the prestressing.

7 Claims, 9 Drawing Figures

HIGH PRESSURE SEAL

BACKGROUND OF THE INVENTION

1. Field of the Invention

The invention relates to a high pressure seal for a high pressure cylinder in a high pressure press intended for hydrostatic extrusion.

2. The Prior Art

During hydrostatic extrusion the work is carried out at very high pressure levels; usually the working pressure is between 10 and 20 kbar. In commercial presses a reliable seal of considerable duration must be achieved at this high pressure, which is to seal between the inner wall of a high pressure cylinder and a movable plunger and an easily removable and insertable die, respectively. The inner diameter of the cylinder at the highest working pressure is from 0.5 to 1 per cent higher than at atmospheric pressure. The Swedish printed patent application Ser. No. 350,817 describes further a seal for an extrusion press for hydrostatic extrusion which provides efficient sealing but is sensitive to surface damage on the inner surface of the liner. This surface damage occurs in the event of temporary leakages of pressure medium between the sealinng ring and the liner. Because of the high pressure, the velocity of outflow of pressure medium will be high in case of leakage, and considerable erosion damage occurs on the liner which, on the one hand, makes further sealing difficult and, on the other hand, causes a danger of fracture which shortens the life of the liner. An exchange of a liner is expensive. An exchange of a damaged seal is less expensive. Leakage is frequently due to the fact that pressure medium sometimes penetrates in between the liner and the sealing ring at the inner part of the sealing ring, and that the sealing ring and the liner only make contact with each other at the extreme end of the sealing ring. If leakage occurs, a considerable drop of pressure is obtained in a short distance, and further a high rate of flow and consequently grave erosion damage even if the amount of liquid leaking out is insignificant. As a rule, the greatest life is obtained when using sealing rings of a material with great strength and thus great yield point. When the pressure in the pressure chamber increases and the diameter of the high pressure cylinder increases, the diameter of the sealing ring must also increase to the same extent, and this results in a tangential stress in the sealing ring which reduces the contact pressure between the sealing ring and the liner. This is unsatisfactory from the point of view of sealing and probably has contributed to the occurrence of leakages in hitherto used sealing constructions.

Summary of the Invention

According to the invention, in a seal for hydrostatic extrusion presses a sealing ring which seals against the inner surface of the high pressure cylinder is prestressed, thus making contact with the cylindrical wall with a force dependent on the prestressing. The prestressing means that there is an interference fit between the cylinder and the sealing ring, that is, that the sealing ring before prestressing has a greater diameter than the high pressure cylinder at atmospheric pressure in the cylinder. Suitably the ring should have a diameter which is more than 0.1 per cent greater than that of the high pressure cylinder. It is suitable to choose the prestressing so that the ring has a tangential stress and a contact pressure dependent on the tangential stress at as high a pressure chamber pressure as is possible. Preferably there should be a tangential stress in the ring, dependent on the prestressing, also at the maximum working pressurre. The prestressing should be as high as the physical properties of the material allow. The yield point of the material determines the upper limit of the prestressing. It has been found that leakages occur more frequently in sealing rings which are not prestressed than in prestressed rings of the same design. In combination with draining channels on the outer part of the contact surface of the ring towards the cylindrical wall, extremely good results have been achieved. By means of the invention it has become possible to provide sealing rings of great material thickness at the sealing zone, by means of which it has become possible to make the rings capable of absorbing great axial loads without being damaged. This is particularly advantageous in extrusion presses of the kind described in U.S. Pat. No. 3,751,958.

BRIEF DESCRIPTION OF THE DRAWINGS

The invention will be explained more fully wtih reference to the accompanying drawings, in which it is applied for sealing between a fixed and a movable part in a high pressure press. In the drawings.

DESCRIPTION OF THE PREFERRED EMBODIMENTS

Figure 1:
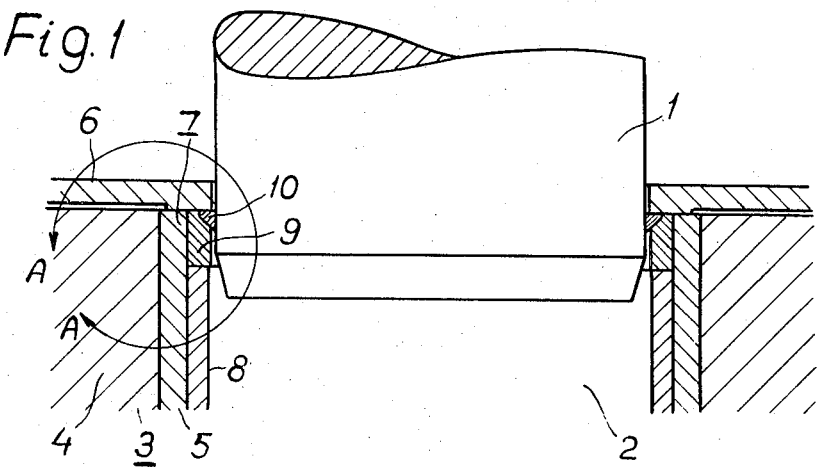
FIG. 1 shows a section through one end of a high pressure chamber with a plunger projectable into a high pressure cylinder for generating a pressure in a pressure medium required for the extrusion.
Figure 2:
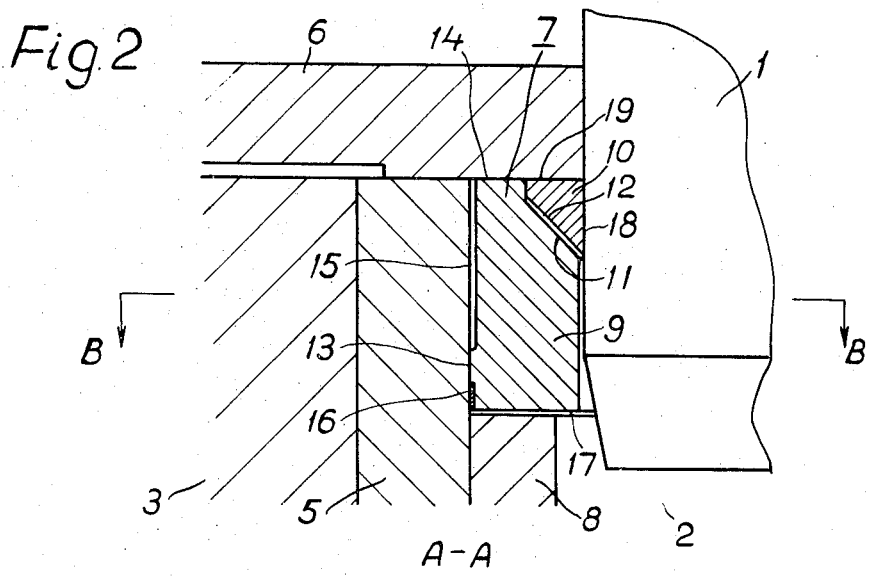
FIG. 2 shows on a larger scale the section encircled by A—A in FIG. 1.
Figure 3:
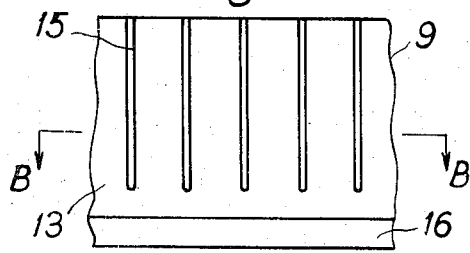
FIG. 3 is a side view of the sealing ring according to FIG. 2.
Figure 4:
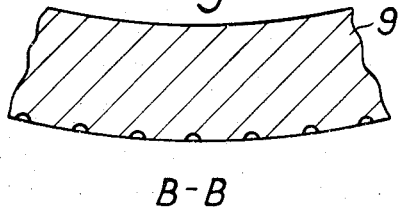
FIG. 4 is a radial section through the sealing ring on the line B—B of FIGS. 2 and 3.

In the figures, 1 designates a movable plunger shown partly projecting into the pressure chamber 2 which is surrounded by a high pressure cylinder 3. This high pressure cylinder comprises a tube wall 4 which may be built up of a tube in a conventional manner and prestressed strips wound around said tube, and an exchangeable liner 5. The cylinder is provided with end pieces 6 forming holders. Between the liner 5 and the plunger 1 is a seal 7. Inside the liners 5 there is a sleeve 8 which, on the one hand, forms a protection for the liner and, on the other hand, forms a spacer preventing the seal 7 from projecting into the high pressure cylinder.

In the embodiment according to FIGS. 1 to 4, the seal consists of a first sealing ring 9 with relatively great axial extension and a substantially rectangular cross-section and a second sealing ring 10 with a substantially triangular cross-section with substantially the same shape size as a recess in one corner of the first sealing ring. Both rings are of hard metal. The inclined surface 11 of the recess and the inclined surface 12 of the ring 10 are turned towards each other and have substantially the same angle of inclination. At low pressure in the cylinder they can make contact with each other. The outer cylindrical surface 13 of the first ring seals against the liner 5 and its outer end surface 14 against the sealing holder 6. The first sealing ring 9 is applied to the high pressure cylinder in a prestressed manner, the the cylindrical surface 13 thus engaging the surface of the liner 5 with a radial force dependent on the prestressing. This prestressing results in an improved sealing particularly in case of low pressure in the cylinder, that is, while the pressure is building up in the pressure chamber. However, it is advantageous to have as high a prestressing as possible, preferably so great that the ring has a remaining prestressing even in case of maximum diameter of the high pressure cylinder of the pressure chamber, that is, at the extrusion pressure.

The outer portion of the surface 13 is suitably provided with draining grooves 16 which guarantee that sealing is obtained at the part of the ring remote from the seal holder, which ring part in order to improve the sealing properties may be coated with an annular layer 16 of a metal which is softer that the material in the ring itself. A steel ring can be coated with a copper layer. The inner end surface 17 of the ring is plane. The draining grooves 15 do not have to be purely axial, but must extend generally longitudinally. They can be obliquely directed in relation to the axial plane. Crossed grooves can be obtained by knurling the surface 13. A knurled surface causes a high and even pressure drop and slight erosion damage to the liner if a leakage should occur.

Figure 5:
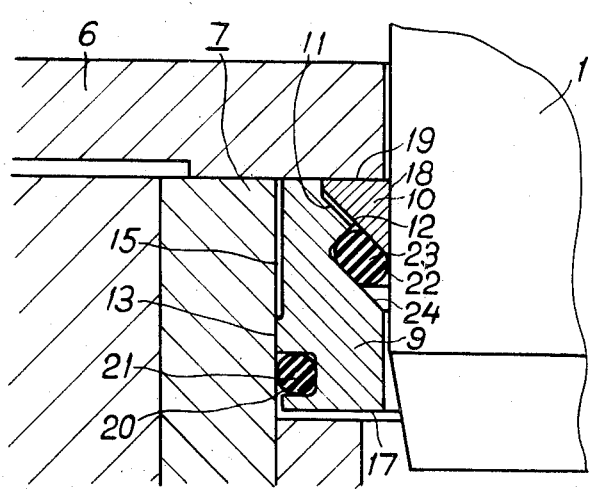
FIGS. 5 to 9 show alternative embodiments of the seal.

In the embodiment according to FIGS. 1 to 4, sealing is effected by metallic sealing rings only. FIG. 5 shows an alternative embodiment of the previously described seal. The sealing ring 9 is provided with an outer annular shot 20 in which an O-ring 21 of a soft sealing material such as a soft metal or elastomeric material such as rubber is inserted. The ring 9 in this case is provided with a second inclined surface 24 as well, which is parallel to the surface 11. In this way an annular slot 22 is formed between the rings 9 and 10. A sealing ring 23 is inserted in said slot 22, said sealing ring bridging the gap between the surfaces 11 and 12 and also making contact with the plunger 1.

The sealing ring 9 described above is capable of absorbing considerable axial forces without being damaged. The seal is most favorable for extrusion presses of the kind described in U.S. Pat. No. 3,751,958, where a unit comprising a mandrel and a sleeve which absorbs forces acting on the mandrel is permanently arranged in the high pressure cylinder of the press. This unit is subjected to axial forces when a billet is inserted and the pressure chamber closed. The sealing rings described are able to absorb these forces and can thus be utilized for fixing the unit axially in the high pressure cylinder of the pressure chamber.

Figure 6:
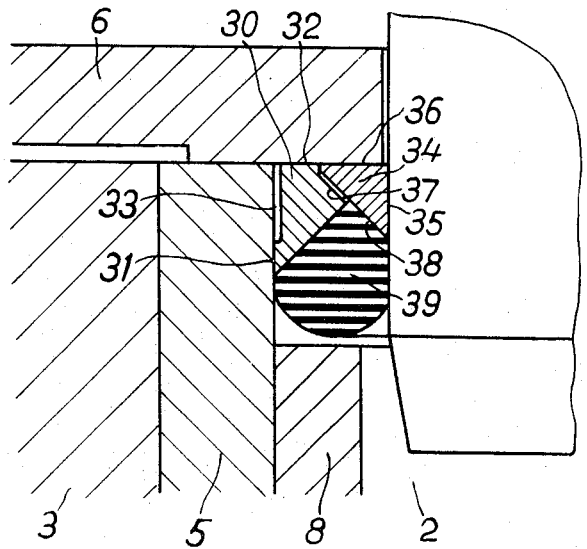
Figure 7:
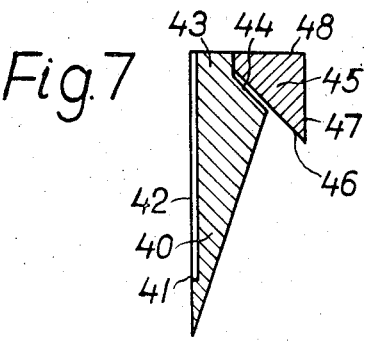
Figure 8:
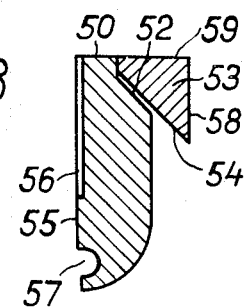

FIGS. 6 to 8 show embodiments which are applicable when the sealing ring does not have to absorb axial forces of any appreciable magnitude from the construction element inside the high pressure cylinder. FIG. 6 shows a seal of generally previously known cross-section made according to the invention. The seal comprises a first sealing ring 30 with an outer cylindrical surface 31 which seals against the liner 5 and a plane surface 32 which seals against the sealing holder 6. The sealing ring 30 is inserted in the liner 5 of the high pressure cylinder in a prestressed manner. The outer surface of the ring is provided with draining grooves 33 in the section nearest the surface 32. The other sealing ring 34 has an inner cylindrical surface 35 sealing against the plunger 1 and a plane surface 36 sealing against the sealing holder 6. The sealing ring 30 has a recess with an inclined surface 37 directed towards the center line of the ring, said surface, facing the inclined surface 38 of the ring 34. A sealing ring 39 of elastomeric material bridges the gap between the inclined surfaces 37 and 38 of the rings 30 and 34 and makes contact with the wall of the liner 5 and the surface of the plunger 1 in a sealing manner.

FIG. 7 shows an alternative embodiment with a substantially triangular sealing ring 40 of great height. The ring 40 is inserted in the liner 5 of the high pressure cylinder in a prestressed manner. The inner corner of the ring then becomes very acute-angled and its outer cylindrical surface 41 high and the draining channels 42 long. The ring has a plane sealing surface 43 as before, which makes contact with the sealing holder 6 in the high pressure cylinder. Also as before the ring has a recess with an inclined surface 44 which faces the inclined surface 46 of the other sealing ring 45. This latter ring has a cylindrical sealing surface 47 and a plane sealing surface 48.

FIG. 8 shows a further embodiment with a first, high sealing ring 50 having a thickness which is considerably less than the width of the gap between the liner 5 and the plunger 1. The ring 50 is inserted into the liner 5 of the high pressure cylinder in a prestressed manner. It has a substantially rectangular cross-section with a recess having an oblique surface 52 facing the oblique surface 54 of the other sealing ring 53. As in previously described seals, the cylindrical surface 55 of the first sealing ring has draining channels 56 but are also provided with an annular slot 57 at the inner part of the ring for a sealing ring (not shown). Like the corresponding ring in previously described seals, the ring 53 has a cylindrical surface 58 and a plane surface 59 sealing against the plunger 1 and the sealing holder 6, respectively.

Figure 9:
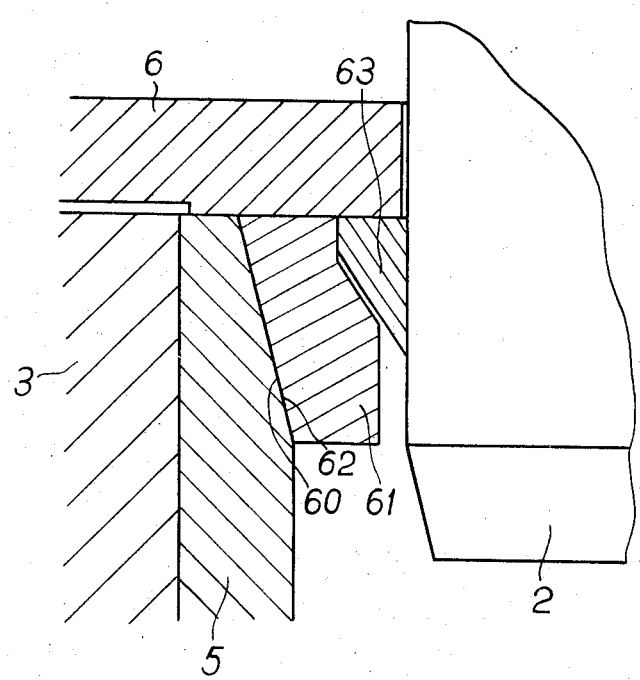

FIG. 9 shows an embodiment where the outer part of the liner 5 is provided with a conical surface 60. The sealing ring 61 making contact with the liner is shaped with an outer conical surface 62 having the same cone angle as the surface 60. The sealing ring 63 sealing against the punch 2 and the sealing holder 6 has an inner portion with a triangular cross-section. The prestressing in the ring 61 can be achieved by providing a ring 61 of a diameter which is more than 0.1 per cent greater than the diameter than the corresponding inner diameter of the sleeve 5 and forcing into the upper end of the sleeve 5 until the upper ends of the members are flush. Thereafter the seal holder 6 is applied and holds the ring under stress.

We claim:

1. In a high pressure press having a seal holder, a high pressure seal to effect sealing between the wall of a high pressure cylinder and an axially movable plunger projecting into the high pressure cylinder, comprising first and second sealing rings of metal, the first ring having an outer surface making contact with the cylindrical wall and an end surface making contact with the seal holder, and the second ring having a cylindrical surface making contact with the plunger and a surface making contact with the seal holder, the first sealing ring which makes contact with the cylindrical wall being prestressed and having a normal diameter which is more than 0.1 per cent greater than the inner diameter of the high pressure cylinder at atmospheric pressure in said high pressure cylinder before prestressing, thereby making contact with the cylindrical wall with a force dependent on the prestressing.

2. High pressure seal according to claim 1, in which the outer surface of the first sealing ring which makes contact with the cylindrical wall, having generally longitudinally extending draining grooves therein in the area nearest to the seal holder extending more than 50 per cent of the height of the ring.

3. High pressure seal according to claim 2, in which the outer surface of the sealing ring remote from the seal holder has a portion with a smooth surface, the width of which is at least 10 per cent of the whole height of the ring.

4. High pressure seal according to claim 1, in which the first sealing ring at its inner part is provided with an outer groove, and a sealing ring of soft material in the groove.

5. High pressure seal according to claim 1, in which the part of the outer surface of the sealing ring remote from the seal holder is coated with a layer of material which is softer than the material of the ring.

6. High pressure seal according to claim 1, in which the first sealing ring has an inclined surface turned towards the center line of the ring, and the second sealing ring has an inclined surface turned towards the inclined surface of the first sealing ring with substantially the same angle of inclination.

7. High pressure seal according to claim 6, having a sealing ring of elastomeric material bridging a gap between the said inclined surfaces.

* * * * *

UNITED STATES PATENT OFFICE
CERTIFICATE OF CORRECTION

Patent No. 3,865,387  Dated February 11, 1975

Inventor(s) Hans Larker and Jan Nilsson

It is certified that error appears in the above-identified patent and that said Letters Patent are hereby corrected as shown below:

Column 3, line 14, "16" should read -- 15 --.

Column 4, line 47 "than the diameter" should be cancelled.

line 48, after "forcing" should be inserted -- it --.

Signed and Sealed this eighteenth Day of May 1976

[SEAL]

Attest:

RUTH C. MASON
Attesting Officer

C. MARSHALL DANN
Commissioner of Patents and Trademarks